United States Patent [19]
Winn

[11] 3,884,534
[45] May 20, 1975

[54] INCREASED DAMPING HYDRODYNAMIC FOIL BEARING

[75] Inventor: Leo W. Winn, Schenectady, N.Y.

[73] Assignee: Mechanical Technology Incorporated, Latham, N.Y.

[22] Filed: Apr. 9, 1974

[21] Appl. No.: 459,018

[52] U.S. Cl. .................................................. 308/9
[51] Int. Cl. ........................................... F16c 17/16
[58] Field of Search ..... 308/9, 73, 121, 160, DIG. 1

[56] References Cited
UNITED STATES PATENTS

| | | | |
|---|---|---|---|
| 3,382,014 | 5/1968 | Marley | 308/73 X |
| 3,615,121 | 10/1971 | Barnett et al. | 308/9 |
| 3,635,534 | 1/1972 | Barnett | 308/121 |
| 3,747,997 | 7/1973 | Winn | 308/9 |
| 3,809,443 | 5/1974 | Cherubim | 308/9 |

Primary Examiner—M. Henson Wood, Jr.
Assistant Examiner—Gene A. Church
Attorney, Agent, or Firm—Joseph V. Claeys; Charles W. Helzer

[57] ABSTRACT

A resilient hydrodynamic foil bearing wherein increased damping is obtained through the use of a bearing insert assembly having at least one bifurcated outer bearing element member. Interaction between the abutting edges of the sections of the outer element create frictional contact which provide a high degree of damping.

7 Claims, 1 Drawing Figure

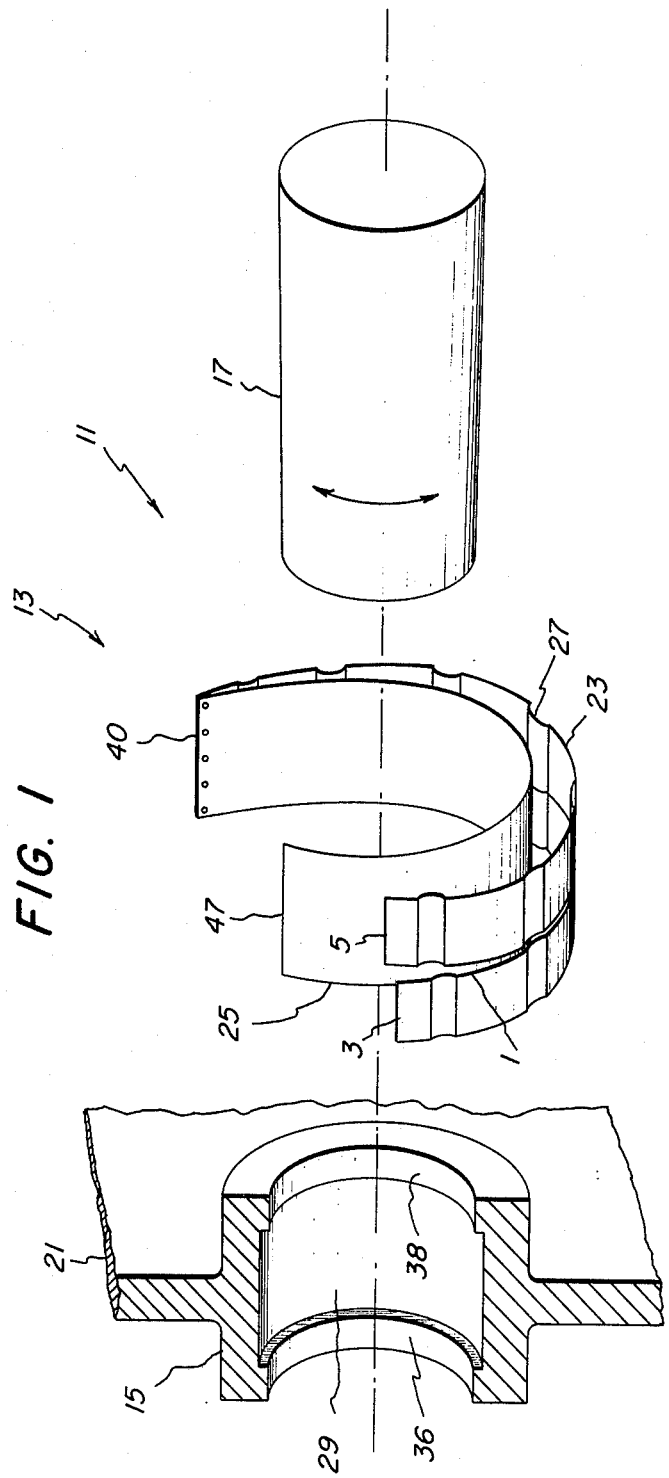

3,884,534

INCREASED DAMPING HYDRODYNAMIC FOIL BEARING

BACKGROUND OF THE INVENTION

1. Field of the Invention

This invention relates generally to resilient hydrodynamic foil bearings, and more specifically to resilient hydrodynamic foil bearings having higher internal damping characteristics than were heretofore obtainable with conventional hydrodynamic foil bearings.

2. Description of the Prior Art

Hydrodynamic foil bearings are widely used in applications where the ability to operate at very high speeds is a requirement. An example of one hydrodynamic foil bearing of the type referred to herein is disclosed in copending patent application Ser. No. 169,372 filed Aug. 8, 1971 now U.S. Pat. No. 3,809,443 and assigned to the same assignee as the present invention.

While the state of the art provides hydrodynamic foil bearings which are useful in many applications, it is often necessary to provide a bearing having a degree of damping higher than can be provided by conventional hydrodynamic foil bearings. Increased damping is necessary for operation at or near speeds of rotation which would be critical with low damping. Applications requiring that subfrequency whirl be reduced to a minimum also require high damping.

Accordingly, it is an object of this invention to provide a hydrodynamic foil bearing having significantly greater damping characteristics than have been heretofore obtainable with conventional bearings.

It is another object of this invention to provide a high damping bearing without sacrificing the advantages of low cost and simplicity of manufacture inherent in current state of the art hydrodynamic foil bearings.

SUMMARY OF THE INVENTION

Briefly stated in accordance with one aspect of this invention a high damping hydrodynamic foil bearing comprises a resilient bearing insert assembly adapted to fit within a supporting structure to support radial and/or axial loads on a movable member such as a shaft. The bearing insert structure includes inner and outer bearing element members, at least one of the outer of which exhibits a plurality of resilient surface elevations which contact and support the other bearing element members during operation and cause the creation of hydrodynamic load supporting films. At least one outer bearing element also exhibits one or more longitudinal discontinuities partially or completely dividing the element into two or more sections. Each discontinuity is sufficiently narrow so that upon relative movement between the sections of the element, frictional contact will occur at the abutting edges thereof. The term bearing element member as used herein means a thin flexible film lubricated web or strip of metal or other suitable material whose thickness relative to its other dimensions is such that it is deflected by the hydrodynamic film forces generated during bearing operation. Examples of suitable bearing elements are thin flexible spring webs or strips of steel, suitable polymeric materials such as polytelrafluorethylene, or of other materials which will function in the particular operating environment to cause the creation of a load supporting hydrodynamic fluid film.

BRIEF DESCRIPTION OF THE DRAWINGS

The novel features believed characteristic of this invention are set forth with particularity in the appended claims. The invention itself however both as to its organization and method of operation, together with further objects and advantages thereof, may best be understood by reference to the following description taken in conjunction with the accompanying drawing and in which:

FIG. 1 is a diagrammatic exploded partial section view of one embodiment of this invention.

DESCRIPTION OF THE PREFERRED EMBODIMENTS

Referring now to FIG. 1, there is shown one embodiment of a high damping hydrodynamic foil bearing in accordance with this invention. The bearing generally designated as 11, is shown in exploded view in horizontal disposition and comprises a resilient bearing insert assembly 13 adapted to fit within supporting structure 15, which may be a bearing housing, to support the load on a movable member shown as a shaft 17 which, as indicated by the arrow may rotate in either direction. Shoulders 36 and 38 define an annular cavity 29 for receiving bearing insert assembly 13 and preventing excessive lateral movement thereof. Conveniently, insert assembly 13 may be fastened to housing 15 by appropriate means to prevent rotation of the assembly.

In accord with this invention, the resilient bearing insert assembly 13 comprises the combination of an inner bearing element member 25 and an outer bifurcated bearing element member 23 exhibiting a longitudinal discontinuity 1 dividing outer element 23 into two portions 3 and 5. The discontinuity 1 may extend over the entire length of outer bearing element member 23, or may extend over only a portion of the length thereof.

Bearing elements 23 and 25 are disposed in top to bottom juxtaposition so as to be in a coacting relationship with each other. Outer bearing element 23 is provided with a plurality of spaced apart resilient surface elevations 27 of a suitable configuration and pattern which are adapted to contact and support the inner bearing element member 25 during operation and which permit deflection of inner bearing element 25 and create hydrodynamic load supporting films. The stiffness of inner bearing element member 25 must be such that sufficient deflection occurs to cause a load supporting hydrodynamic film to be created.

The operation of the bearing of this invention may best be understood by first separately considering the operation of hydrodynamic foil bearings generally. The rotating shaft creates dynamic film forces on inner element 25 which it will be recalled is resiliently supported by outer bearing element 23. Due to this resilient support, deformation of inner element 25 occurs and certain localized load supporting fluid film wedges are formed. The extent, location, and profile of both the deformation of inner bearing element member 25 and the resulting load supporting fluid films are determined by the combination of the geometry of the resilient surface elevations 27, the speed of the shaft, the stiffness of the various bearing element members and the viscosity of the lubricant among other things.

The shaft is thus rotatably supported by the hydrodynamic fluid films created by the interaction of bearing elements 23 and 25 of the resilient bearing insert assembly 13.

This interaction between the members 23 and 25, and the hydrodynamic film forces is important in providing cushioning and damping to imposed fluctuating loads. I have discovered that by making at least one outer bearing element member 23 discontinuous, that the damping can be greatly increased. This increased damping has been measured at values up to ten times more obtainable in the hydrodynamic foil bearings which have been known heretofore.

As far as is presently understood the additional damping achieved by the present invention is due to the interaction of the two portions 3 and 5 of the bifurcated outer bearing insert member 23 at the abutting edges thereof. It is important therefore that the discontinuity 1 be narrow enough so that upon relative motion of portions 3 and 5 there will be contact between them.

It is the friction created by the rubbing of one member against the other as a result of relative motion between them which yields the greatly increased damping achieved by this invention.

The form which the invention will take in a particular application depends upon the type of bearing to which it is applied. Within the general constraint that the bearing be of the resilient hydrodynamic foil type, the invention may be applied to increase the damping of many specific types of bearings.

Referring specifically to the bearing insert assembly 13 of FIG. 1, the resilient outer foil 23 is provided with a plurality of spaced apart elevations 27 which coact with and resiliently support the inner bearing element 25. A longitudinal discontinuity 1 extends generally perpendicular to the elevations along the length of member 25. While the discontinuity is shown extending over the full length of member 25, it could conveniently terminate short of the end of member 25 so as to form a single member having two leaves 2 and 3. Inner member 25 and outer member 23 are joined together in any convenient manner as for example by spot welds 40 as illustrated. If a greater degree of damping is desired than can be obtained through the use of a single discontinuity, multiple discontinuities are possible.

While it is convenient to divide the outer bearing element member 23 perpendicular to the resilient surface elevations 27, it may be preferable to construct the discontinuity in such a manner as to extend diagonally across member 23 producing thereby a longer discontinuity and thereby generating more friction and creating higher damping.

The invention is readily adapted to the type of hydrodynamic foil bearing having a plurality of thin foils resiliently supported to create load supporting films. By providing one or more of the intermediate foils, not the top or inner foil, with a generally longitudinal discontinuity, the benefits of the invention can be realized. As in the example described in conjunction with the bearing illustrated in FIG. 1, increased damping may be obtained through the use of multiple splits or of diagonal placement of the discontinuity. Alternatively, discontinuities may be provided in additional intermediate foils.

In neither of the described examples is it desirable to split the inner most foil. The load carrying capacity of a hydrodynamic bearing is related to the width of the load carrying film and therefore of the bearing. Two bearings whose widths combined equal the width of a third bearing will not, all other considerations being equal, carry the same load. This is due to fluid leakage at the edges of the bearings. Since two small bearings have four edges while one large bearing has but two, the edge leakage effects are doubled, reducing the load carrying capacity. For this reason only the outer members are split, leaving the inner member intact and retaining therefore the full load carrying capacity.

I have found that the life of the high damping bearing is not significantly reduced by the frictional contact between the two members 3 and 5 of outer bearing element 23. As far as is presently understood, this is due to the mechanism through which wear takes place at the discontinuity. Rather than the erosion of metal from the edges of members 3 and 5 as might be anticipated, there occurs fretting, or the transfer of metal from member to member. This results in a bearing having high damping characteristics for a relatively large portion of its life.

In certain applications where bearing element replacement is difficult or otherwise undesirable, it is preferable to employ a bearing with exceptionally long life. The edges of the abutting members may conveniently, treated by any of a number of well known techniques, as for example carburizing, chrome plating, electrolyzing or nitriding, to minimize the wearing effects of the frictional contact and to increase the life of the bearing.

Although there have been described herein what is considered at present to be the preferred embodiments of the invention, many modifications and changes may occur to those skilled in the art. It is intended therefor that the appended claims cover all such modifications and changes as fall within the true spirit and scope of the invention.

What we claim and desire to secure by Letters Patent of the United States is:

1. A resilient hydrodynamic foil bearing of the type wherein an inner bearing element is resiliently supported by at least one outer bearing element in a cavity between two relatively movable surfaces so that upon relative movement of said surfaces a hydrodynamic load carrying film is formed by deflection of said inner and outer bearing elements wherein the improvement comprises at least one generally longitudinal discontinuity in at least one of said outer bearing elements dividing it into two or more sections which coact with each other upon relative motion therebetween.

2. The resilient hydrodynamic foil bearing recited in claim 1 wherein said discontinuity extends over the full length of said outer bearing element.

3. The resilient hydrodynamic foil bearing recited in claim 1 wherein said discontinuity extends over only a portion of the length of said outer bearing element.

4. The resilient hydrodynamic foil bearing recited in claim 1 wherein at least two discontinuities divide said outer bearing element.

5. The resilient hydrodynamic foil bearing recited in claim 1 wherein said two relatively movable surfaces are a rotating shaft, and a housing surrounding said shaft.

6. The resilient hydrodynamic foil bearing recited in claim 1 wherein said coaction between said two or more outer bearing element sections is frictional contact at the abutting edges thereof.

7. A method for increasing the damping of an hydrodynamic foil bearing of the type wherein an inner bearing element member coacts with and is resiliently supported by at least one outer bearing element member to rotatably support a shaft so that upon rotation one or more hydrodynamic load supporting films is created by deflection of said elements comprising:
  a. splitting at least one of said outer elements into at least two longitudinal sections; and
  b. allowing said sections to coact by frictional contact at the edges thereof.

* * * * *